(12) United States Patent
Imanishi et al.

(10) Patent No.: US 9,768,668 B2
(45) Date of Patent: Sep. 19, 2017

(54) COOLING SYSTEM OF POWER CONVERTER FOR ON-VEHICLE ROTARY ELECTRIC MACHINE

(75) Inventors: Yuto Imanishi, Atsugi (JP); Atsushi Yokoyama, Hitachiota (JP); Hiroyuki Yamada, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 1043 days.

(21) Appl. No.: 13/977,470

(22) PCT Filed: Jan. 12, 2012

(86) PCT No.: PCT/JP2012/050448
§ 371 (c)(1),
(2), (4) Date: Jun. 28, 2013

(87) PCT Pub. No.: WO2012/098978
PCT Pub. Date: Jul. 26, 2012

(65) Prior Publication Data
US 2013/0285486 A1    Oct. 31, 2013

(30) Foreign Application Priority Data
Jan. 18, 2011    (JP) .................................. 2011-008009

(51) Int. Cl.
*H02K 9/19*    (2006.01)
*B60L 3/00*    (2006.01)
(Continued)

(52) U.S. Cl.
CPC .............. *H02K 9/19* (2013.01); *B60L 3/0061* (2013.01); *H02M 1/32* (2013.01); *B60K 11/02* (2013.01);
(Continued)

(58) Field of Classification Search
CPC . B60K 11/02; B60K 2001/003; B60L 3/0061; H02K 9/19; H02M 1/32; H02M 2001/327; H02M 7/5387; Y02T 10/641
(Continued)

(56) References Cited

U.S. PATENT DOCUMENTS 5,606,239 A * 2/1997 Schumann ............... B60K 1/04
                                                          336/55
6,965,514 B2 * 11/2005 Beihoff ................... B60L 11/12
                                                          165/80.4
(Continued)

FOREIGN PATENT DOCUMENTS

DE  10 2008 033 676 A1  7/2009
JP      2-115755 A      4/1990
(Continued)

OTHER PUBLICATIONS

Japanese Office Action dated Dec. 24, 2013 {Two (2) pages}.
(Continued)

*Primary Examiner* — Tyler J Lee
(74) *Attorney, Agent, or Firm* — Crowell & Moring LLP

(57) ABSTRACT

A cooling system includes a cooling circuit that has a circulation pump circulating a coolant containing antifreeze solution and cools down, by means of the coolant, a power element mounted in a power converter for an on-vehicle rotary electric machine; a control signal calculation unit that calculates heat quantity generated by the power element; a power element temperature sensor that detects the temperature of the power element; and a coolant temperature sensor that detects the temperature of the coolant. The control signal calculation unit calculates, on the basis of the heat quantity, the temperature of the power element, and the coolant temperature, power element cooling performance that is the amount of heat transferred from the power element to the coolant per unit temperature difference, and lowers the driving power of the circulation pump when the calculated power element cooling performance is greater than a predetermined criterion.

17 Claims, 14 Drawing Sheets

(51) Int. Cl.
*H02M 1/32* (2007.01)
*B60K 11/02* (2006.01)
*B60K 1/00* (2006.01)
*H02M 7/5387* (2007.01)

(52) U.S. Cl.
CPC ..... *B60K 2001/003* (2013.01); *H02M 7/5387* (2013.01); *H02M 2001/327* (2013.01); *Y02T 10/641* (2013.01)

(58) Field of Classification Search
USPC .............................................. 701/22; 310/53
See application file for complete search history.

(56) References Cited

U.S. PATENT DOCUMENTS

| | | |
|---|---|---|
| 7,043,933 B1 | 5/2006 | Knight |
| 8,127,564 B2 * | 3/2012 | Takamatsu ............. B60K 11/02 180/65.1 |
| 2006/0113661 A1 | 6/2006 | Yamabuchi et al. |
| 2009/0020346 A1 * | 1/2009 | Krauer ..................... B60L 1/04 180/65.1 |
| 2009/0032229 A1 | 2/2009 | Gallegos-Lopez et al. |
| 2013/0164573 A1 * | 6/2013 | Williams ............. B60L 11/187 429/50 |

FOREIGN PATENT DOCUMENTS

| | | | | |
|---|---|---|---|---|
| JP | 2004324613 | * | 4/2003 | ......... Y02T 10/6286 |
| JP | 2006-156711 A | | 6/2006 | |
| JP | 2008-130791 A | | 6/2008 | |
| JP | 2010-199120 A | | 9/2010 | |
| JP | 2010-199180 A | | 9/2010 | |

OTHER PUBLICATIONS

Corresponding International Search Report with English Translation dated Apr. 10, 2012 (four (4) pages).

German Office Action dated Jan. 8, 2015 with English-language translation (Fourteen (14) pages).

* cited by examiner

COOLING SYSTEM OF POWER CONVERTER FOR ON-VEHICLE ROTARY ELECTRIC MACHINE

TECHNICAL FIELD

The present invention relates to a cooling system of a power converter for an on-vehicle rotary electric machine.

BACKGROUND ART

There has been known a control system which adjusts the flow rate of a coolant in accordance with a state of a cooling system with the intent to reduce energy consumption thereof, the cooling system being provided to circulate the coolant when equipment such as a vehicle drive motor or an inverter in a hybrid vehicle or an electric vehicle is to be cooled down. According to the invention described in PTL 1, for example, the flow rate of a coolant is adjusted on the basis of an operating state of a pump which circulates the coolant and the temperature of a power element.

CITATION LIST

Patent Literature

PTL 1: Japanese Patent Application Laid-Open No.

SUMMARY OF INVENTION

Technical Problem

Now, a heat transfer rate between a power element and a coolant varies with the condition of the coolant (concentration of antifreeze solution, a flow rate, and temperature). The coolant however cannot be controlled in accordance with, for example, the concentration of the antifreeze solution in the invention described in PTL 1, whereby it is difficult to properly operate a pump in accordance with the concentration of the antifreeze solution.

Solution to Problem

According to a first aspect of the present invention, a cooling system of a power converter for an on-vehicle rotary electric machine includes:

a cooling circuit which has a circulation pump to circulate a coolant containing antifreeze solution and cools down, by using the coolant, a power element mounted in a power converter for an on-vehicle rotary electric machine;

a heat quantity calculation unit which calculates heat quantity generated by the power element;

a first temperature acquisition unit which acquires temperature of the power element;

a second temperature acquisition unit which acquires temperature of the coolant;

a heat transfer rate calculation unit which calculates, on the basis of the heat quantity, the temperature of the power element, and the temperature of the coolant, a heat transfer rate that is an amount of heat transferred from the power element to the coolant per unit temperature difference; and a pump control unit which decreases an amount of the coolant discharged by the circulation pump when the heat transfer rate calculated is greater than a predetermined heat transfer rate reference.

According to a second aspect of the present invention, in the cooling system of a power converter for an on-vehicle rotary electric machine according to the first aspect, the second temperature acquisition unit preferably calculates the temperature of the coolant on the basis of the heat quantity generated by the power element that is calculated by the heat quantity calculation unit and the temperature of the power element that is acquired by the first temperature acquisition unit.

According to a third aspect of the present invention, the cooling system of a power converter for an on-vehicle rotary electric machine according to the first or second aspect preferably includes a reference setting unit which sets the heat transfer rate reference in accordance with a level of the temperature of the power element acquired by the first temperature acquisition unit.

According to a fourth aspect of the present invention, in the cooling system of a power converter for an on-vehicle rotary electric machine according to any one of the first to third aspects, the pump control unit increases an amount of the coolant discharged by the circulation pump when the heat transfer rate calculated is less than the predetermined heat transfer rate reference.

According to a fifth aspect of the present invention, the cooling system of a power converter for an on-vehicle rotary electric machine according to any one of the first to fourth aspects preferably includes:

a heat exchanger which is provided in the cooling circuit to exchange heat between outside air and the coolant;

a blower which blows outside air to the heat exchanger;

a third temperature acquisition unit which acquires outside air temperature;

a heat exchange rate calculation unit which calculates a heat exchange rate between the outside air and the coolant on the basis of the heat transfer rate, the temperature of the coolant, and the outside air temperature; and a blow control unit which decreases an air flow supplied from the blower when the heat exchange rate calculated is greater than a predetermined heat exchange rate reference.

According to a sixth aspect of the present invention, in the cooling system of a power converter for an on-vehicle rotary electric machine according to the fifth aspect, the third temperature acquisition unit preferably uses temperature acquired by the first temperature acquisition unit or the second temperature acquisition unit at the time the cooling system is started as the outside air temperature.

According to a seventh aspect of the present invention, in the cooling system of a power converter for an on-vehicle rotary electric machine according to any one of the first to sixth aspects, the heat quantity calculation unit preferably calculates the heat quantity on the basis of torque information and speed information of a rotary electric machine.

According to an eighth aspect of the present invention, in the cooling system of a power converter for an on-vehicle rotary electric machine according to any one of the first to sixth aspects, the heat quantity calculation unit preferably calculates the heat quantity on the basis of a current value flowing through the power element.

According to an ninth aspect of the present invention, the cooling system of a power converter for an on-vehicle rotary electric machine according to any one of the first to eighth aspects includes:

a concentration calculation unit which calculates concentration of antifreeze solution contained in the coolant on the basis of the temperature of the coolant acquired by the second temperature acquisition unit, the heat transfer rate calculated by the heat transfer rate calculation unit, and a control signal output from the pump control unit; and an alarm device which issues an alarm to warn about freezing of the coolant on the basis of the concentration of the antifreeze solution calculated by the concentration calculation unit.

Advantageous Effects of Invention

According to the present invention, the energy consumed by the cooling system of a power converter for an on-vehicle rotary electric machine can be reduced.

DESCRIPTION OF EMBODIMENTS

Embodiments of the present invention will now be described with reference to the drawings.

First Embodiment

Figure 1:
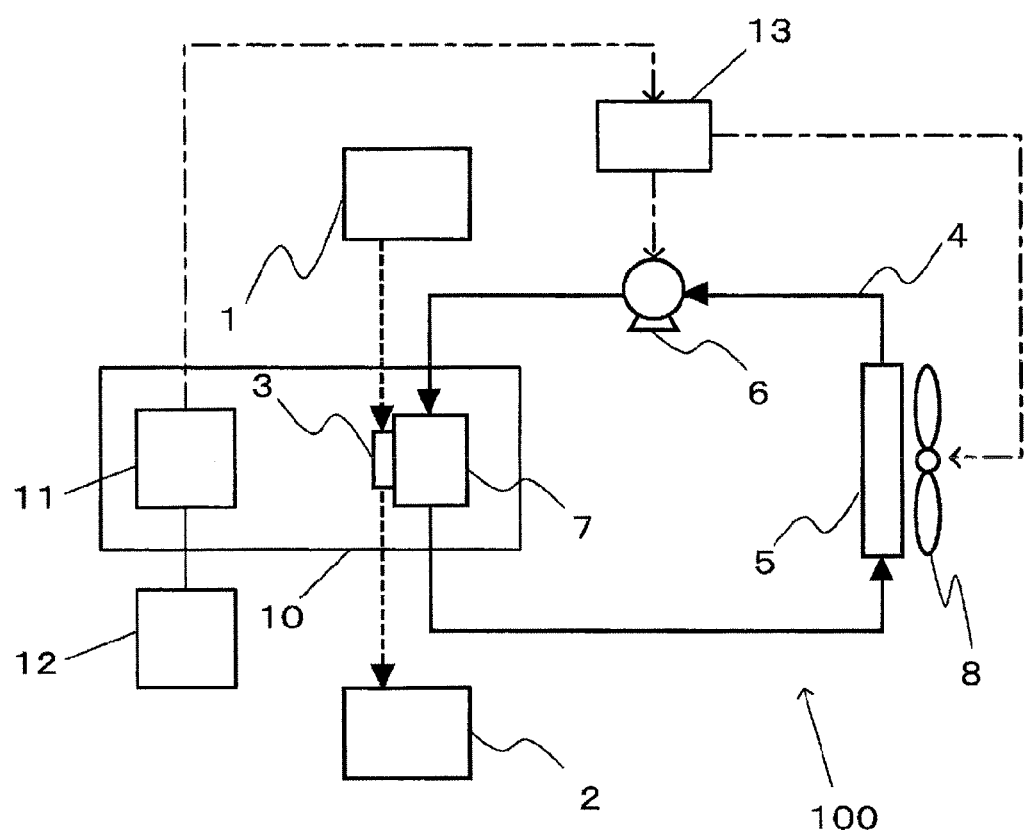
FIG. 1 is a diagram illustrating the schematic configuration of a cooling system according to a first embodiment.

FIG. 1 is a diagram illustrating the schematic configuration of a cooling system according to a first embodiment, namely, a cooling system 100 for a power converter used in an electrically driven vehicle such as an HEV and an EV. Note that in FIG. 1, a solid line arrow indicates the flow of a coolant whereas a dotted line arrow indicates the flow of an electric current.

A power converter 10 supplies power to a motor 2 that is an on-vehicle rotary electric machine by converting direct-current power from a battery 1 into alternating-current power, and includes a power element 3 constituting an inverter circuit. The power element 3 is driven by a command from a control unit 11. As described below, the control unit 11 generates a control signal on the basis of a torque command value or the like for the motor 2, the value being input from an upper control system 12 on the vehicle side, and performs drive control on the power element 3 on the basis of the control signal.

Figure 14:
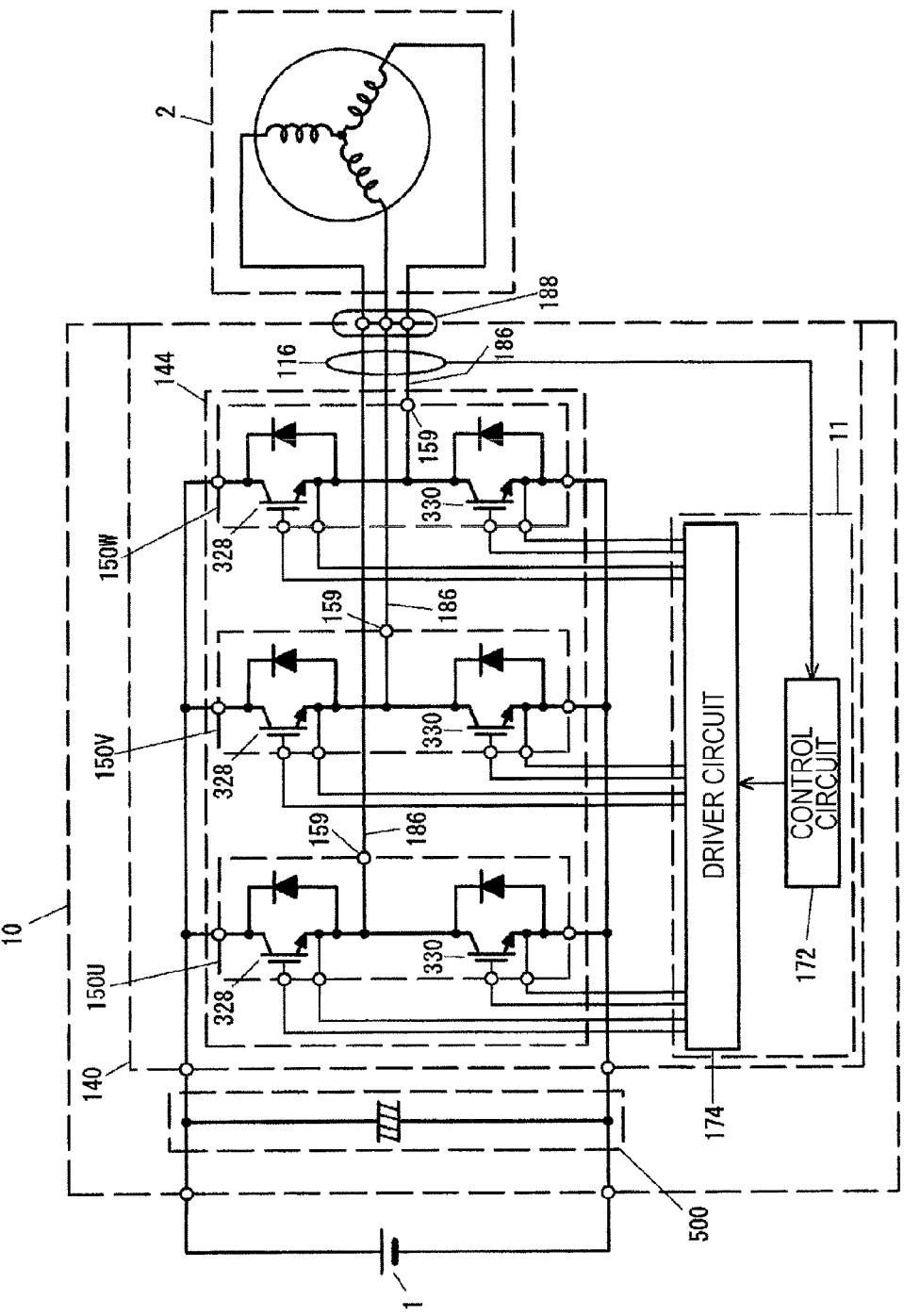
FIG. 14 is a diagram illustrating the electric circuit configuration of a power converter 10.

FIG. 14 is a diagram illustrating the electric circuit configuration of the power converter 10. As illustrated in FIG. 14, the power converter 10 includes an inverter unit 140 and a capacitor module 500, and the inverter unit 140 includes an inverter circuit 144 and the control unit 11. The inverter circuit 144 includes a three-phase bridge circuit including three upper and lower arm series circuits 150 (150U to 150W) corresponding to a U-phase, a V-phase, and a W-phase, respectively.

Each upper and lower arm series circuit 150 includes IGBTs 328 and 330 (insulated gate bipolar transistor) as the power element 3. An alternating current terminal 159 at a middle point of each upper and lower arm series circuit 150 is connected to an alternating-current power line 186 to the motor 2. The alternating-current power line 186 is electrically connected to a corresponding phase coil of an armature coil in the motor 2 via an alternating current connector 188. The control unit 11 includes a driver circuit 174 which performs drive control on the inverter circuit 144, and a control circuit 172 which supplies a control signal to the driver circuit 174.

The IGBTs 328 and 330 operate in response to a drive signal output from the control unit 11 and convert direct-current power supplied from the battery 1 into three-phase alternating-current power. The capacitor module 500 is provided to configure a smoothing circuit which suppresses the fluctuation of direct-current voltage generated by the switching operation of the IGBTs 328 and 330.

The control unit 11 is provided to operate the IGBTs 328 and 330, and includes the control circuit 172 and the driver circuit 174. The control circuit 172 generates, on the basis of input information from another control system (such as the aforementioned upper control system 12), a sensor or the like, a timing signal which controls a switching timing of the IGBTs 328 and 330. The driver circuit 174 generates, on the basis of the timing signal output from the control circuit 172, a drive signal which causes the IGBTs 328 and 330 to perform the switching operation.

The control circuit 172 includes a microcomputer (hereinafter referred to as a "micon") which calculates the switching timing of the IGBTs 328 and 330. A target torque value required for the motor 2, a current value supplied from the upper and lower arm series circuit 150 to the armature coil of the motor 2, and a magnetic pole position of a rotor of the motor 2 are input into the micon as input information. The target torque value is based on the torque command value output from the upper control system 12. The current value is detected on the basis of a detection signal output from a current sensor (a power element current sensor) 116. The magnetic pole position is detected on the basis of a detection signal output from a motor speed sensor 112.

The micon incorporated in the control circuit 172 calculates d-axis and q-axis current command values for the motor 2 on the basis of the target torque value, calculates d-axis and q-axis voltage command values on the basis of the difference between the calculated d-axis and q-axis current command values and the detected d-axis and q-axis current values, and then converts the calculated d-axis and q-axis voltage command values into U-phase, V-phase, and W-phase voltage command values on the basis of the detected magnetic pole position. The micon then generates a pulse form modulated wave on the basis of the comparison between a fundamental wave (sine wave) based on the U-phase, the V-phase, and the W-phase voltage command values and a carrier wave (triangle wave), and outputs the modulated wave that is generated to the driver circuit 174 as a PWM (pulse width modulated) signal.

When driving a lower arm, the driver circuit 174 amplifies the PWM signal, which is then output as a drive signal to a gate electrode of the IGBT 330 of the corresponding lower arm. When driving an upper arm, on the other hand, the driver circuit amplifies the PWM signal after shifting the level of a reference potential of the PWM signal to the level of a reference potential of the upper arm, and then outputs the amplified signal as a drive signal to a gate electrode of the IGBT 328 of the corresponding upper arm. As a result, each of the IGBTs 328 and 330 would perform the switching operation on the basis of the drive signal having been input.

Referring back to FIG. 1, the power converter 10 is provided with a cooling passage through which the coolant flows, where the power element 3 is fixed to a heat radiating plate 7 disposed within the cooling passage. The heat radiating plate 7 exchanges heat between the coolant flowing through the cooling passage and the power element 3. The cooling passage provided in the power converter 10 constitutes a part of a cooling circuit 4 of the cooling system 100. A heat exchanger 5 for exchanging heat between the coolant and the air (outside air), a circulation pump 6 for circulating the coolant, and the heat radiating plate 7 are sequentially connected in the cooling circuit 4. An ethylene glycol solution is used as the coolant which circulates through the cooling circuit 4, for example. The heat exchanger 5 includes a blower fan 8 which blows in air. Moreover, the cooling system 100 is provided with a cooling control system 13 which controls the operation of the circulation pump 6 and the blower fan 8.

The power element 3 is cooled down by transferring the heat generated therein to the coolant through the heat radiating plate 7. The coolant which have received the heat from the power element 3 is then circulated to the heat exchanger 5 by the circulation pump 6 and exchanges heat with the air (outside air) blown in by the blower fan 8, thereby radiating the heat.

Figure 2:
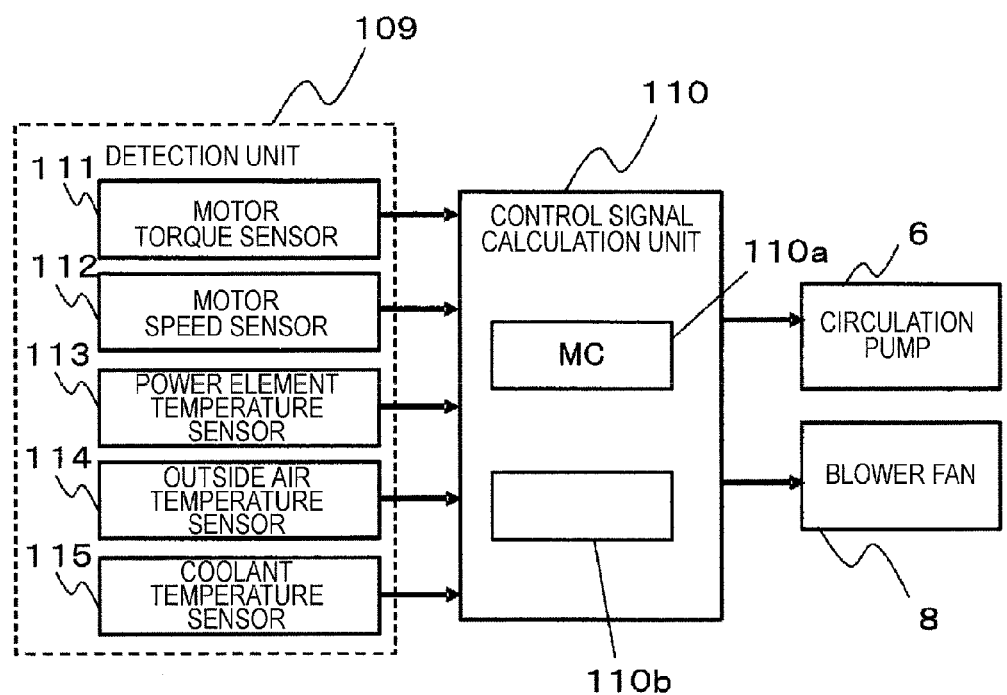
FIG. 2 is a diagram illustrating the schematic configuration of a cooling control system 13 which controls a circulation pump 6 and a blower fan 8.

FIG. 2 is a diagram illustrating the schematic configuration of the cooling control system 13 which controls the circulation pump 6 and the blower fan 8. Here, a solid line arrow in FIG. 2 indicates the flow of a control signal. The cooling control system 13 includes a detection unit 109 which detects a signal used for the control and a control signal calculation unit 110 which calculates a control signal for the circulation pump 6 and the blower fan 8.

The detection unit 109 includes: a motor torque sensor 111 which detects torque that is the drive state of the motor 2; a motor speed sensor 112 which detects rotational speed that is the drive state of the motor 2; a power element temperature sensor 113 which detects the temperature of the power element 3; an outside air temperature sensor 114 which detects the outside air temperature; and a coolant temperature sensor 115 which detects the temperature of the coolant. The power element temperature sensor 113 is provided at a part where the power element 3 and the heat radiating plate 7 are fixed together. The motor torque sensor ill employs a strain gauge or the like. The motor speed sensor 112 employs a Hall element or the like. The power element temperature sensor 113, the outside air temperature sensor 114, and the coolant temperature sensor 115 employ a thermistor or the like.

Each signal from each of the sensors 111 to 115 is input to the control signal calculation unit 110. A microcomputer 110a provided in the control signal calculation unit 110 then calculates, on the basis of the signal which has been input, a control signal which determines the drive state of the circulation pump 6 and the blower fan 8, and outputs each control signal to each of the circulation pump 6 and the blower fan 8. Moreover, data (a numerical map to be described below) required for the calculation of the control signal is stored beforehand in a memory 110b provided in the control signal calculation unit 110.

Figure 3:
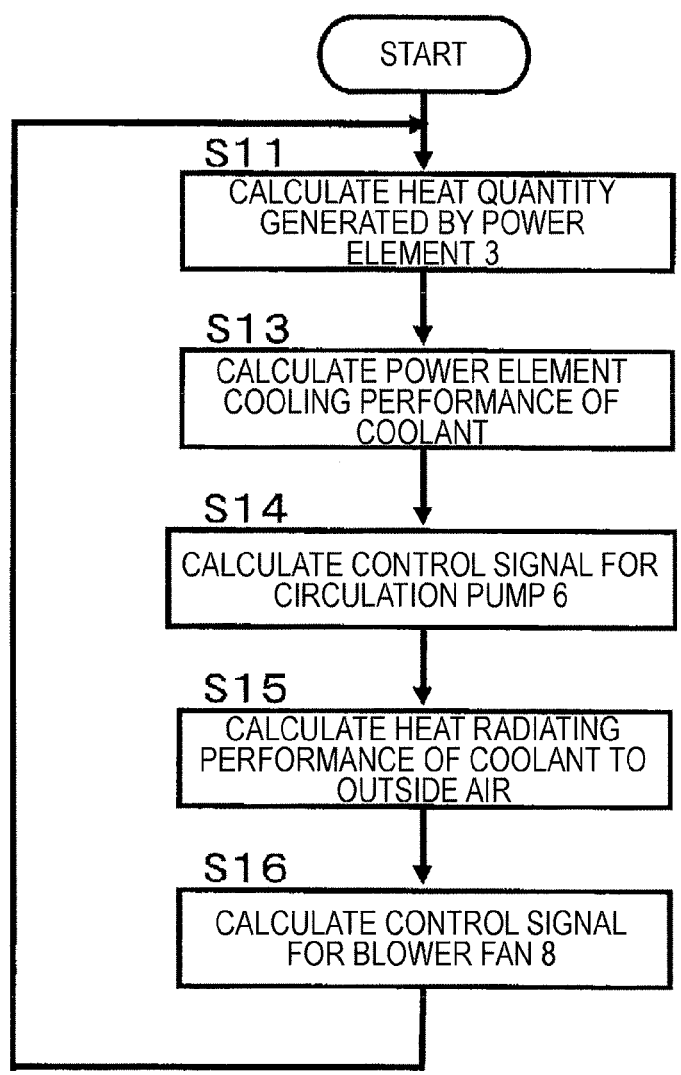
FIG. 3 is a flowchart illustrating the process of controlling the circulation pump 6 and the blower fan 8 according to the first embodiment.

FIG. 3 is a flowchart illustrating the process of controlling the circulation pump 6 and the blower fan 8 by the control signal calculation unit 110. The microcomputer 110a provided in the control signal calculation unit 110 sequentially executes processes illustrated in FIG. 3 by means of software processing. Note that the microcomputer 110a starts the processing of a program illustrated in FIG. 3 once an ignition key switch of a vehicle has been turned on.

In step S11, the microcomputer calculates the amount of heat generated by the power element 3 on the basis of the detected values obtained by the motor torque sensor 111 and the motor speed sensor 112. As described above, the control unit 11 which drives the power element 3 outputs the control signal to the power element 3 on the basis of the torque command value and the speed command value for the motor 2 that are input from the upper control system 12. The power element 3 is then driven on the basis of the control signal and outputs the current value based on the torque command value and the speed command value to the motor 2. Therefore, the amount of heat generated by the power element 3 can be estimated by the calculation using the torque and the speed of the motor 2.

In the present embodiment, the numerical map illustrating the correlation between the torque and the speed of the motor 2 and the amount of heat generated by the power element 3 is stored in the memory 110b included in the control signal calculation unit 110. Thus, in the process performed in step S11, the amount of heat generated by the power element 3 is obtained by searching the numerical map.

In step S13, the microcomputer calculates power element cooling performance α of the coolant by using the following formula (1) on the basis of heat quantity Q generated by the power element 3 calculated in step S11, temperature Ta detected by the coolant temperature sensor 115, and temperature Tw detected by the power element temperature sensor 113. The right side of the formula α×(Tw−Ta) expresses the amount of heat radiated from the power element 3 to the coolant. Here, the temperature Tw of the power element 3 is determined such that the amount of heat radiated would be equal to the heat quantity Q generated by the power element 3. Accordingly, the power element cooling performance of the coolant reflecting the current condition thereof can be obtained by calculating the power element cooling performance α.

$$Q = \alpha \times (Tw - Ta) \quad (1)$$

As it is understood from formula (1), the power element cooling performance α is equivalent to the heat quantity (heat transfer rate) per unit temperature difference which is transferred from the heat radiating plate 7 provided with the power element 3 to the coolant. Moreover, the power element cooling performance α varies with the condition of the coolant circulating through the cooling circuit 4, the condition being the flow rate n, the temperature Ta, and the concentration of the antifreeze solution m and being represented as $\alpha(m,n,Ta)$.

For example, the power element cooling performance $\alpha$ would be improved by boosting the driving power of the circulation pump 6 to increase the discharge quantity and the flow rate n of the coolant, in which case the flow velocity of the coolant would increase at a part where the heat radiating plate 7 and the coolant exchange heat. The power element cooling performance $\alpha$ would also be improved when the temperature Ta of the coolant is increased, in which case the viscosity of the coolant containing the antifreeze solution would be decreased so that the flow velocity of the coolant would increase at a part where the heat radiating plate 7 and the coolant exchange heat. With regards to the concentration of the antifreeze solution m contained in the coolant, the power element cooling performance $\alpha$ would be improved when the concentration is decreased, in which case the viscosity of the coolant would be decreased so that the flow velocity of the coolant would increase at a part where the heat radiating plate 7 and the coolant exchange heat.

Figure 12:
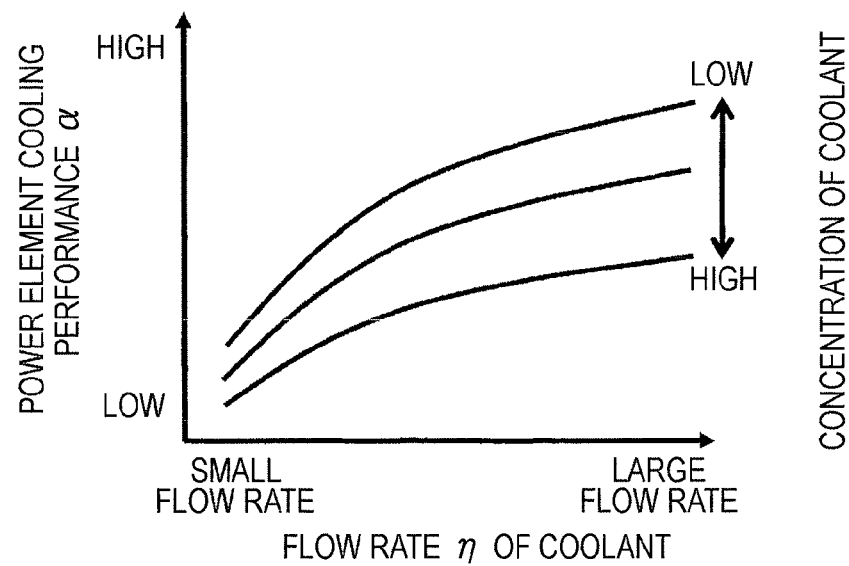
FIG. 12 is a graph illustrating an example of a numerical map stored in a memory 110b.

FIG. 12 is a graph illustrating the power element cooling performance $\alpha$ at a specific coolant temperature Ta, where the vertical axis represents the power element cooling performance $\alpha$ and the horizontal axis represents the flow rate n of the coolant circulated by the circulation pump. The flow rate n is determined by the control signal calculated by the control signal calculation unit 110. While FIG. 12 illustrates three curves representing the power element cooling performance $\alpha$ for three levels of concentration of the antifreeze solution m, the map in practice is sufficiently adapted for the concentration of the antifreeze solution that falls within a predetermined range. As described above, the power element cooling performance $\alpha$ is improved with the increase in the flow rate n. Moreover, the power element cooling performance $\alpha$ would be improved by decreasing the concentration of the antifreeze solution m, which is illustrated by the figure where the entire curve is shifted upward. The map illustrated in FIG. 12 is prepared as many as the map can cover the temperature range of the coolant. In the present embodiment, the map related to the power element cooling performance $\alpha(m,n,Ta)$ as illustrated in FIG. 12 is stored beforehand as the numerical map in the memory 110b of the control signal calculation unit 110.

In step S14, the microcomputer calculates the control signal for the circulation pump 6 on the basis of the power element cooling performance $\alpha$ of the coolant calculated in step S13 and thereafter controls the circulation pump 6 by the control signal.

Figure 4:
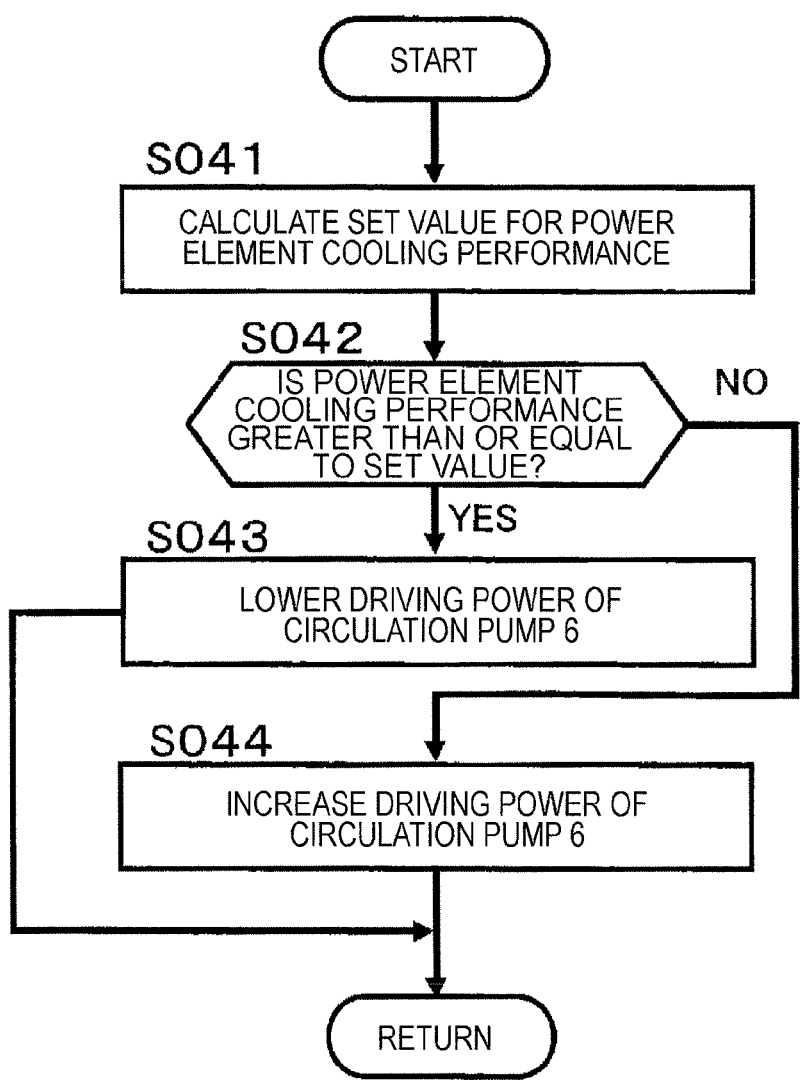
FIG. 4 is a flowchart illustrating the detail of the control processing performed in step S14.

FIG. 4 is a flowchart illustrating the detail of the control processing performed in step S14. In step S041, the microcomputer calculates, on the basis of the temperature Ta detected by the coolant temperature sensor 115, a set value $\alpha$th for the power element cooling performance $\alpha$ when controlling the circulation pump 6, the set value $\alpha$th being the determination criterion used for the determination in step S042. The method for setting the set value $\alpha$th will be described later.

In step S042, the microcomputer compares the current power element cooling performance $\alpha$ calculated in step S13 with the set value $\alpha$th for the power element cooling performance $\alpha$ set in step S041 and determines whether or not $\alpha \geq \alpha$th holds true. This determination process determines whether the heat radiating performance of the heat radiating plate 7 from the power element 3 to the coolant exceeds or falls below a predetermined heat radiation (the heat radiation determined by the set value $\alpha$th). The power element cooling performance $\alpha(m0,n0,Ta0)$ under the condition (m0,n0,Ta0) at the time the system was designed may be used as the set value $\alpha$th before changing the setting, for example.

As described above, the power element cooling performance $\alpha$ of the coolant at the heat radiating plate 7 varies depending on the condition of the coolant, namely, the concentration of the antifreeze solution m, the flow rate n of the coolant, and the coolant temperature Ta. Accordingly, when the power element cooling performance $\alpha$ has exceeded the predetermined set value $\alpha$th due to the change in the coolant condition, there is a margin of performance in terms of cooling the power element, whereby the level of the power element cooling performance $\alpha$ can be lowered to that of the set value $\alpha$th by lowering the driving power of the circulation pump 6 and decreasing the discharge quantity of the coolant.

Figure 13:
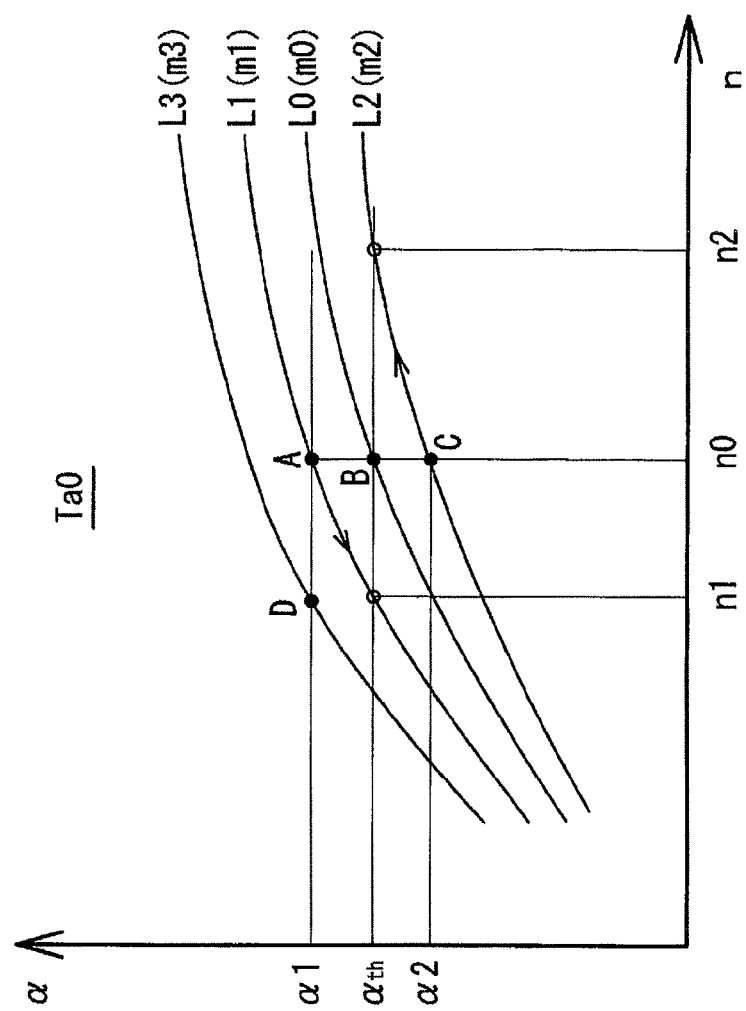
FIG. 13 is a graph illustrating a map of antifreeze solution m, a flow rate n, and power element cooling performance α where coolant temperature is Ta=Ta0.

An example in which the concentration of the antifreeze solution m has changed will be described with reference to FIG. 13. FIG. 13 is a map where the coolant temperature Ta is equal to Ta0. A curve L0 represents the power element cooling performance when the concentration of the antifreeze solution is m0, while curves L1 and L2 likewise represent the power element cooling performance when the concentration of the antifreeze solution is m1 and m2, respectively. Here, each concentration is set such that m1<m0<m2 holds true, whereby each of the curves L0 to L2 is shifted upward in the order of m2, m0, and m1 since the power element cooling performance would be improved as the concentration of the antifreeze solution m decreases, as described above. The concentration of the antifreeze solution m0 is set to the concentration at the time the system was designed, so that it is determined whether the concentration of the antifreeze solution m has increased or decreased on the basis of m0.

For example, when the concentration of the antifreeze solution has changed by the replacement of the coolant or the like and, as a result, the actual condition of the coolant has turned to (m1,n0,Ta0), the power element cooling performance $\alpha 1 = \alpha(m1,n0,Ta0)$ would take the value at point A on the curve L1 illustrated in FIG. 13. On the other hand, the set value $\alpha$th would take the value at point B on the curve L0. In this case, $\alpha(m1,n0,Ta0) > \alpha$th holds true, meaning that there is a margin equivalent to $\alpha(m1,n0,Ta0) - \alpha$th in the power element cooling performance of the coolant. Accordingly, the flow rate can be decreased from n0 down to n1 when the concentration of the antifreeze solution is m1.

On the contrary, when the concentration of the antifreeze solution is m2 as indicated by point C on the curve L2, the power element cooling performance $\alpha 2 = \alpha(m2,n0,Ta0)$ would be insufficient relative to the set value $\alpha$th by the amount equal to $\alpha$th$-\alpha(m2,n0,Ta0)$, whereby the flow rate n needs to be increased up to n2.

When it is determined in step S042 that $\alpha \geq \alpha$th holds true, the process proceeds to step S043 where the flow rate of the coolant is decreased by lowering the driving power (that is the discharge quantity of the coolant) of the circulation pump 6 by a preset value. In other words, when it is determined that there is a margin of performance in terms of the power element cooling performance $\alpha$ of the coolant, the flow rate of the coolant is decreased by lowering the driving power (that is the discharge quantity of the coolant) of the circulation pump 6. As a result, the energy consumed in driving the circulation pump 6 can be reduced while retaining the cooling performance for the power element 3.

While the condition of the coolant, namely, the flow rate n0, the coolant temperature Ta0, and the concentration of the antifreeze solution m1, is assumed in the example illustrated in FIG. 13, the flow rate n1 will not always be determined accurately since the actual concentration of the antifreeze solution m is unknown. For example, when the flow rate is n≠n0 and the concentration of the antifreeze solution is m3, the calculated power element cooling performance α would have the value indicated by point D on a curve L3. Accordingly, in step S043, the driving power may be lowered only by a preset flow rate decrease amount Δn as described above, or may be lowered by the decrease amount that varies in accordance with the difference=α(m1,n0,Ta0)−αth.

When it is determined in step S042 that α<αth holds true, on the other hand, the process proceeds to step S044 where the flow rate of the coolant is increased by increasing the driving power of the circulation pump 6. In other words, when it is determined that the power element cooling performance α of the coolant is insufficient, the flow rate of the coolant is increased by increasing the driving power of the circulation pump 6. As a result, the excessive temperature rise of the power element 3 can be prevented, thereby improving the reliability of the power element 3. Note that the increase amount of the flow rate in step S044 is set similarly to the way the decrease amount of the flow rate set in the aforementioned step S043.

After the flow rate of the coolant is decreased to n1 by lowering the driving power of the circulation pump 6 in step S043, the power element cooling performance would accordingly decrease from α(m1,n0,Ta0) to a (m1,n1,Ta0). As a result, the amount of heat radiated would be decreased so that the power element temperature Tw would increase until the formula (1) is satisfied, that is, until the heat quantity Q generated would be equal to the amount of heat radiated. As described above, the power element temperature Tw is relatively low when there is a margin of performance in terms of the power element cooling performance α(m1,n0,Ta0), in which case the increase in the power element temperature Tw can be afforded by decreasing the flow rate n. On the other hand, when the flow rate is increased to n2 in step S044, the power element cooling performance would be improved to α(m1,n2,Ta0) so that the power element temperature Tw would be decreased.

While it is determined in step S042 whether or not α≥αth holds true, it may also be determined whether any of α>αth, α=αth, or α<αth holds true. When it is determined that α=αth holds true, the circulation pump 6 would be controlled without changing the driving power thereof so that the driving power is maintained.

As described above, the power element cooling performance α of the coolant changes depending on the condition thereof (the concentration of the antifreeze solution m, the flow rate n, and the temperature Ta of the coolant). In the present embodiment, the change in the power element cooling performance α caused by the change in the coolant condition is detected by comparing the estimated power element cooling performance α with the set value αth, the estimated power element cooling performance being estimated on the basis of the calculated heat quantity generated by the power element 3, the measured temperature Tw of the power element 3, and the measured temperature Ta of the coolant. Then, when a margin is generated in terms of the power element cooling performance α by the change in the coolant condition, the energy consumption can be reduced by lowering the driving power of the circulation pump 6. When it is determined that the power element cooling performance α is insufficient, on the other hand, the flow rate of the coolant is increased by increasing the driving power of the circulation pump 6 so that the reliability of the power element 3 would be improved.

Moreover, FIG. 13 has been used to describe the case where the power element cooling performance α changes due to the change in the concentration of the antifreeze solution m as the coolant condition. In this case, while considering the relationship "the decrease in the concentration of the antifreeze solution m→the improvement of the power element cooling performance α→the decrease in the power element temperature Tw", the circulation pump 6 is controlled as described above by comparing the power element cooling performance α calculated on the basis of the power element temperature Tw with the reference αth.

The condition of the coolant relevant to the power element cooling performance α includes the flow rate n of the coolant and the temperature Ta of the coolant besides the concentration of the antifreeze solution m. As is the case with the concentration of the antifreeze solution m, the relationships "the increase in the coolant temperature Ta→the decrease in the viscosity of the coolant→the improvement of the power element cooling performance α→the decrease in the power element temperature Tw" and "the increase in the flow rate n→the improvement of the power element cooling performance α→the decrease in the power element temperature Tw" hold true for the temperature and the flow rate of the coolant, respectively. Therefore, by comparing the power element cooling performance α calculated on the basis of the power element temperature Tw with the reference αth, the circulation pump can be controlled when any of the concentration of the antifreeze solution m, the flow rate n of the coolant, and the temperature Ta of the coolant is changed.

When the coolant temperature Ta is changed, the temperature Tw of the power element 3 would typically change in response to the coolant temperature Ta. In other words, as is understood from Tw=Ta+Q/α(m,n,Ta) of formula (1), the power element temperature Tw would change with the change in the coolant temperature Ta even when the heat quantity Q is fixed. When the coolant temperature Ta is decreased, however, the viscosity of the coolant would increase resulting in the decrease in α(m,n,Ta), whereby Q/α(m,n,Ta) would increase. Therefore, the power element temperature Tw does not always decrease when the coolant temperature Ta is decreased. The same can be said for the case where the coolant temperature Ta is increased.

In the present embodiment, the power element temperature sensor 113 provided to detect the temperature of the power element 3 allows the power element temperature Tw to be detected directly. When the power element temperature Tw is decreased, the margin created with respect to the upper limit temperature of the power element temperature Tw would allow the set value αth for the power element cooling performance to be lowered by that margin.

Therefore in the aforementioned process in step S041, the set value αth would be lowered when the power element temperature Tw is decreased. When the power element temperature Tw is increased, on the other hand, the set value αth would be increased to be able to cope with the increase in the heat generated by the power element 3.

Referring back to FIG. 3, in step S15, the microcomputer calculates heat radiating performance to outside air β of the coolant by using formula (2) on the basis of the power element cooling performance α calculated in step S13, the temperature Ta detected by the coolant temperature sensor 115, and temperature (outside air temperature) Tg detected by the outside air temperature sensor 14.

$$\beta = Q \div (Ta - Tg) \quad (2)$$

The heat radiating performance to outside air β is the heat exchange rate equivalent to the heat quantity per unit temperature difference which is transferred from the coolant to the outside air by the heat exchanger 5. The heat radiating performance to outside air β varies depending on the flow rate n of the coolant circulating, the coolant temperature Ta, the concentration of the antifreeze solution m, and air flow γ of the outside air supplied to the heat exchanger 5. The dependency relationship is described as follows.
(a) When the flow rate n of the coolant circulated by the circulation pump 6 is decreased, the flow velocity of the coolant would decrease at a part where the heat exchanger 5 and the coolant exchange heat, thereby causing the heat radiating performance to outside air β to be lowered.
(b) When the coolant temperature Ta is decreased, the viscosity of the coolant would increase, thereby causing the flow velocity of the coolant to decrease at a part where the heat exchanger 5 and the coolant exchange heat and thus causing the heat radiating performance to outside air β to be lowered.
(c) When the concentration of the antifreeze solution m is increased, the viscosity of the coolant would increase, thereby causing the flow velocity of the coolant to decrease at a part where the heat exchanger 5 and the coolant exchange heat and thus causing the heat radiating performance to outside air β to be lowered.
(d) When the supplied air flow γ of the outside air blown by using the blower fan 8 is increased, the flow velocity of the outside air would increase at a part where the heat exchanger 5 and the outside air exchange heat, thereby causing the heat radiating performance to outside air β to be improved.

In step S16, the microcomputer calculates a drive signal for the blower fan 8 on the basis of the heat radiating performance to outside air β of the coolant calculated in step S15, the coolant temperature Ta detected by the coolant temperature sensor 115, and the temperature Tg detected by the outside air temperature sensor 114, so that the drive of the blower fan 8 is controlled by the drive signal. In other words, the supplied air flow γ is varied.

Figure 5:
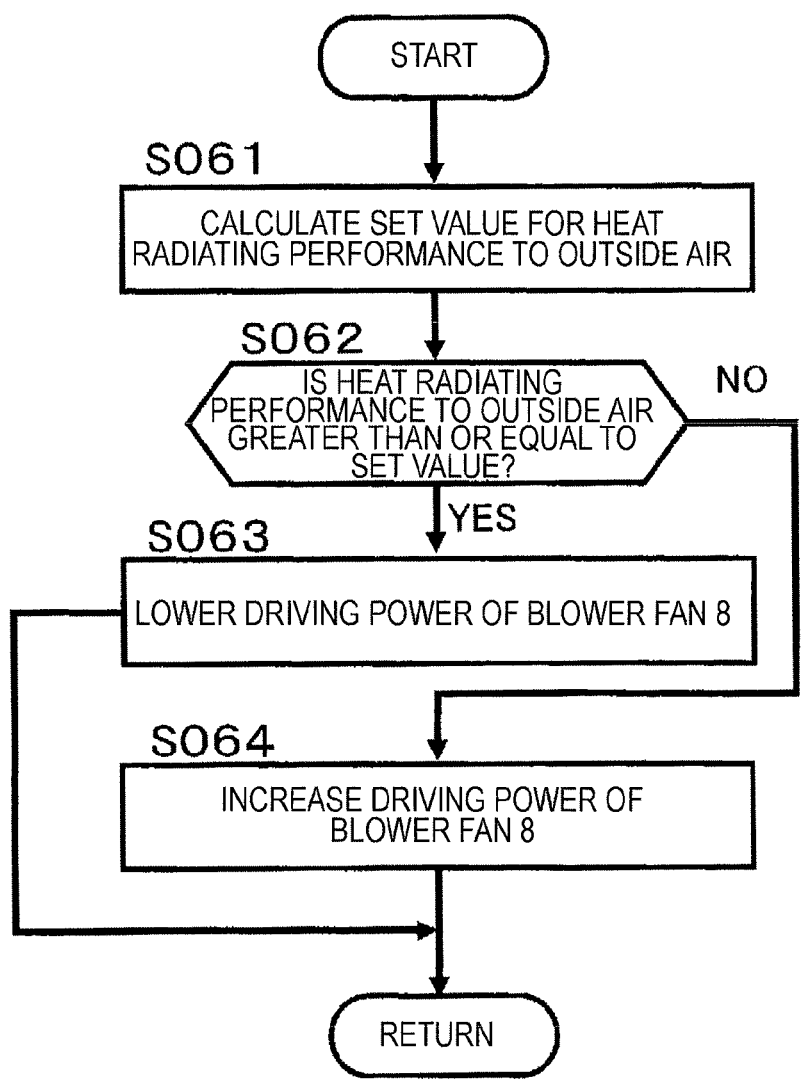
FIG. 5 is a flowchart illustrating the detail of the control processing performed in step S16.

FIG. 5 is a flowchart illustrating the detail of the drive control processing performed in step S16. In step S061, a set value βth to be the determination criterion for the heat radiating performance to outside air β in controlling the blower fan 8 is calculated on the basis of the detected coolant temperature Ta and the temperature Tg detected by the outside air temperature sensor 114. The detail of the set value βth will be described in step S062.

In step S062, the microcomputer compares the heat radiating performance to outside air β calculated in step S15 with the set value βth for the heat radiating performance to outside air calculated in step S061 and determines whether or not β≥βth holds true. This determination process determines whether the current heat quantity exchanged by the heat exchanger 5 exceeds or falls below a predetermined reference value of the exchanged heat quantity (that is the exchanged heat quantity at the set value βth).

Now, the exchanged heat quantity at the set value βth represents the reference value of the heat quantity exchanged by the heat exchanger 5, the set value βth being the exchanged heat quantity under the condition at the time the system was designed, for example. The heat quantity exchanged by the heat exchanger 5 however varies depending on the temperature difference between the outside air and the coolant as well as the heat radiating performance to outside air β. Accordingly, the exchanged heat quantity would increase when the temperature difference is increased by the decrease in the outside air temperature, or when the heat radiating performance to outside air β is improved by the decrease in the concentration of the antifreeze solution m, for example.

Since the determination performed in step S062 is based upon the heat radiating performance to outside air β instead of the exchanged heat quantity, the same heat radiating performance to outside air would have varied exchanged heat quantity, which is the object of the determination, when the temperature difference is changed by the change in the outside air temperature. Therefore, in step S061, the set value βth for the heat radiating performance to outside air is set in accordance with the temperature Tg detected by the outside air temperature sensor 114. For example, the set value βth is set by adding or subtracting a preset quantity Δβ to/from a preset set value β0 (such as the heat radiating performance to outside air under the condition at the time the system was designed).

When the outside air temperature Tg decreases, the temperature difference would increase, thereby causing the heat quantity exchanged between the outside air and the coolant to increase even when the heat radiating performance to outside air β stays the same. As a result, with the lower heat radiating performance to outside air β, the heat exchange can be achieved in the amount equivalent to that before the outside air temperature Tg is decreased. The set value βth for the heat radiating performance to outside air β would thus be lowered when the outside air temperature Tg is decreased. When the outside air temperature Tg is increased, on the contrary, the set value βth would be increased since the exchanged heat quantity may be insufficient unless the heat radiating performance to outside air β is improved.

Moreover, when the coolant temperature Ta is decreased, the temperature of the power element 3 would be decreased as described in the control processing in FIG. 4 so that the power element 3 would have a margin relative to the upper limit temperature thereof. The reference for the heat quantity exchanged by the heat exchanger 5 can thus be lowered by lowering the set value βth for the heat radiating performance to outside air β. When the coolant temperature Ta is increased, on the contrary, the heat quantity exchanged by the heat exchanger 5 would be increased by increasing the set value βth for the heat radiating performance to outside air β. As a result, the reliability of the power element 3 can be improved by decreasing the temperature Ta of the coolant.

When it is determined in step S062 that β≥βth holds true, the process proceeds to step S063 where the driving power of the blower fan 8 is lowered. That is, when it is determined that there is a margin in terms of the heat quantity currently exchanged by the heat exchanger 5, the exchanged heat quantity would be suppressed by lowering the driving power of the blower fan 8 and decreasing the flow rate of the air to be blown. When the concentration of the antifreeze solution m is low, for example, the heat radiating performance to outside air β of the coolant would be improved followed by the increase in the exchanged heat quantity, whereby the energy consumed by the blower fan 8 can be reduced by performing the process to lower the driving power of the blower fan 8 as in step S063.

On the other hand, when it is determined that β<βth holds true in step S062, the process proceeds to step S064 where the driving power of the blower fan 8 is increased, thereby causing the flow rate of the air blown in to be increased and thus the heat quantity exchanged by the heat exchanger 5 to be increased. Such control can thus prevent the heat quantity exchanged by the heat exchanger 5 from decreasing when the concentration of the antifreeze solution m is high and the heat radiating performance to outside air β of the coolant is low, for example.

The process proceeds back to step S11 after completing the process in step S16 in FIG. 3. The series of processes from step S11 to step S16 will be performed repeatedly until the ignition key switch of the vehicle will have been turned off.

Second Embodiment

Figure 6:
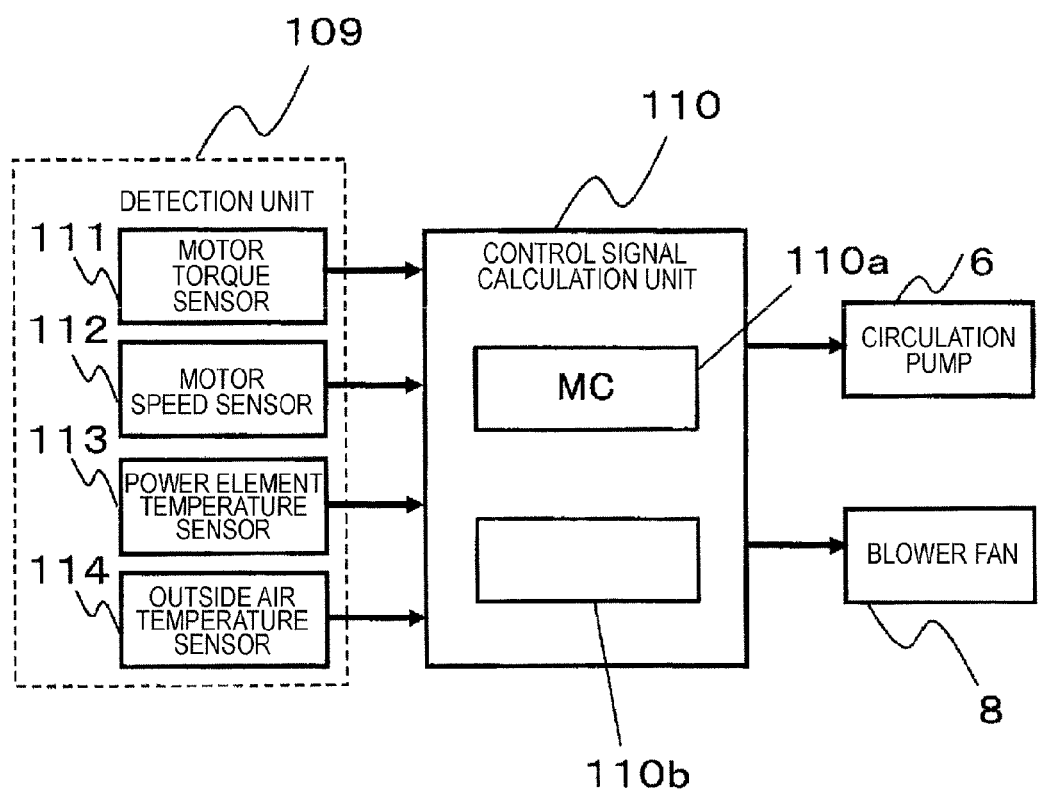
FIG. 6 is a diagram illustrating the schematic configuration of a cooling control system 13 according to a second embodiment.

A second embodiment of the present invention will now be described with reference to FIGS. 6 and 7. FIG. 6 is a diagram illustrating the schematic configuration of a cooling control system 13 according to the second embodiment. The configuration illustrated in FIG. 6 is different from the first embodiment in that the coolant temperature sensor 115 illustrated in FIG. 2 is omitted from FIG. 6.

Figure 7:
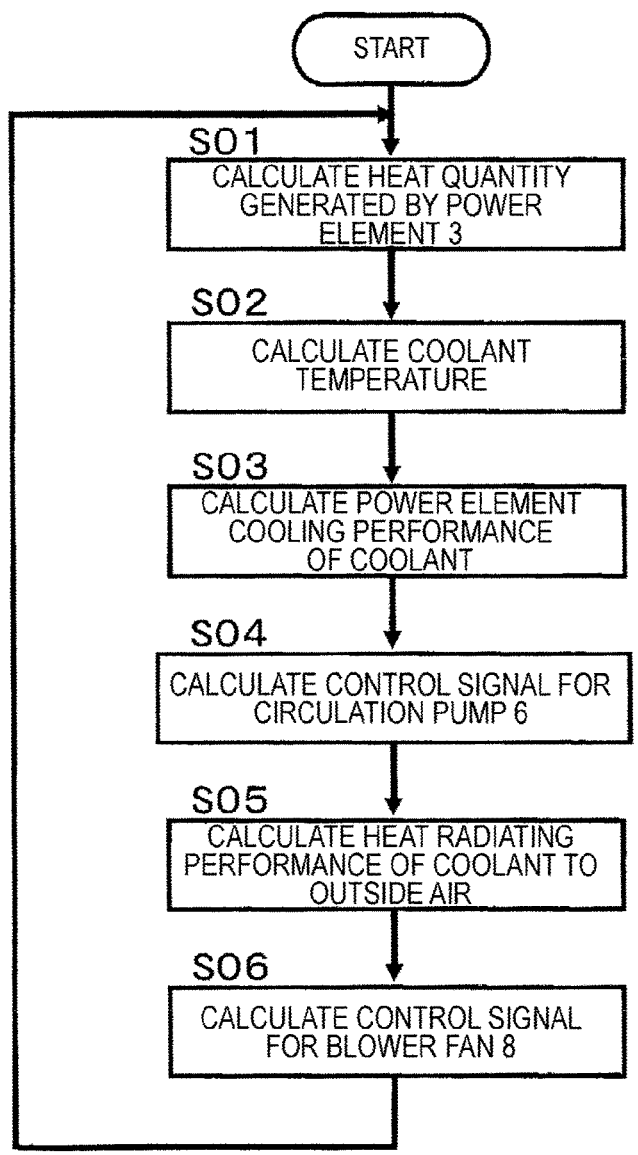
FIG. 7 is a flowchart illustrating the process of controlling a circulation pump 6 and a blower fan 8 according to the second embodiment.

FIG. 7 is a flowchart illustrating the process of controlling a circulation pump 6 and a blower fan 8 by a control signal calculation unit 110. A microcomputer 110a provided in the control signal calculation unit 10 sequentially executes processes illustrated in FIG. 7 by means of software processing. Note that the microcomputer 110a starts the processing of a program illustrated in FIG. 7 once an ignition key switch of a vehicle has been turned on. In the following, there will be described mainly what is different from the first embodiment.

In step S01, the microcomputer calculates the amount of heat generated by a power element 3 on the basis of the detected values obtained by a motor torque sensor 111 and a motor speed sensor 112. In step S02, the microcomputer calculates temperature Ta of a coolant on the basis of heat quantity Q generated by the power element 3 calculated in step S01 and temperature Tw of the power element 3 detected by a power element temperature sensor 113. The temperature of the power element 3 is strongly affected by the coolant temperature. The temperature of the power element 3 is substantially equal to the coolant temperature when the power element 3 is not generating heat. The temperature of the power element 3 will rise according to the heat quantity generated by the power element 3. Accordingly, the temperature rise of the coolant can be calculated from the temperature and the generated heat quantity of the power element 3. As expressed in formula (3), for example, the temperature Ta measured after a predetermined time has elapsed since Q=0 was satisfied is set to be the temperature Tw of the coolant. The present embodiment is thus configured to estimate the temperature of the coolant by calculation while omitting a temperature sensor which detects the temperature of the coolant.

$$Ta=Tw \text{ (only after a predetermined time has elapsed since } Q=0 \text{ was satisfied)} \quad (3)$$

In step S03, the microcomputer calculates power element cooling performance α of the coolant by using the aforementioned formula (1) on the basis of the heat quantity Q generated by the power element 3 calculated in step S01, the temperature Ta of the coolant calculated in step S02, and the temperature Tw detected by the power element temperature sensor 113. That is, the power element cooling performance α of the coolant reflecting the current condition thereof is estimated.

In step S04, the microcomputer calculates a control signal for the circulation pump 6 on the basis of the power element cooling performance α of the coolant calculated in step S03 and thereafter controls the circulation pump 6 by the control signal. The control processing performed in step S04 is similar to that performed in step S14 of FIG. 3, whereby the series of processes illustrated in FIG. 4 will be performed in step S04 as well.

In the subsequent step S05, the microcomputer calculates heat radiating performance to outside air β of the coolant by using the aforementioned formula (2) on the basis of the power element cooling performance α calculated in step S03, the coolant temperature Ta calculated in step S02, and temperature (outside air temperature) Tg detected by the outside air temperature sensor 114. The detailed description of this step will be omitted as the process is similar to that performed in step S15 of FIG. 3.

In step S06, the microcomputer controls the drive of the blower fan 8 on the basis of the heat radiating performance to outside air β of the coolant calculated in step S05, the coolant temperature Ta calculated in step S02, and the temperature Tg detected by the outside air temperature sensor 114. The control processing performed in step S06 is similar to that performed in step S16 of FIG. 3, whereby the series of processes illustrated in FIG. 5 will be performed in step S06 as well.

The process proceeds back to step S01 after completing the process in step S06. The series of processes from step S01 to step S06 will be performed repeatedly until the ignition key switch of the vehicle will have been turned off.

In the second embodiment, the coolant temperature Ta is calculated by formula (3) as in step S02 on the basis of the heat quantity Q generated by the power element 3 and the temperature Tw of the power element 3 detected by the power element temperature sensor 113. The calculation using formula (3) has been illustrated as an example. The relationship between the temperature and the heat quantity Q of the power element 3 and the temperature rise of the coolant may be stored beforehand in the memory 110b as a numerical map so that the temperature Ta can be calculated on the basis of the temperature Tw and the heat quantity Q of the power element 3 as well as the map. Accordingly, the temperature sensor for detecting the coolant temperature can be omitted.

The rest is similar to the first embodiment. That is, the change in the power element cooling performance α caused by the change in the condition of the coolant (the concentration of the antifreeze solution m, the flow rate n, and the temperature Ta of the coolant) is estimated by the temperature Ta and the heat generation of the power element 3. Then, when a margin is generated in terms of the power element cooling performance α by the change in the coolant condition, the energy consumption can be reduced by decreasing the driving power of the circulation pump 6. When it is determined that the power element cooling performance α is insufficient, on the contrary, the flow rate of the coolant is increased by increasing the driving power of the circulation pump 6 so that the reliability of the power element 3 would be improved.

Note that the temperature Tg detected by the outside air temperature sensor 114 used in steps S05 and S06 above may be replaced by the temperature detected by the power element temperature sensor 113 when the ignition key switch is turned on, since the coolant temperature Ta and the temperature Tw of the power element 3 measured after a fixed time has elapsed since the power element 3 stopped generating heat would be substantially equal to the outside air temperature. As a result, the blower fan 8 can be controlled without providing the detection unit with the outside air temperature sensor 114.

Third Embodiment

Figure 8:
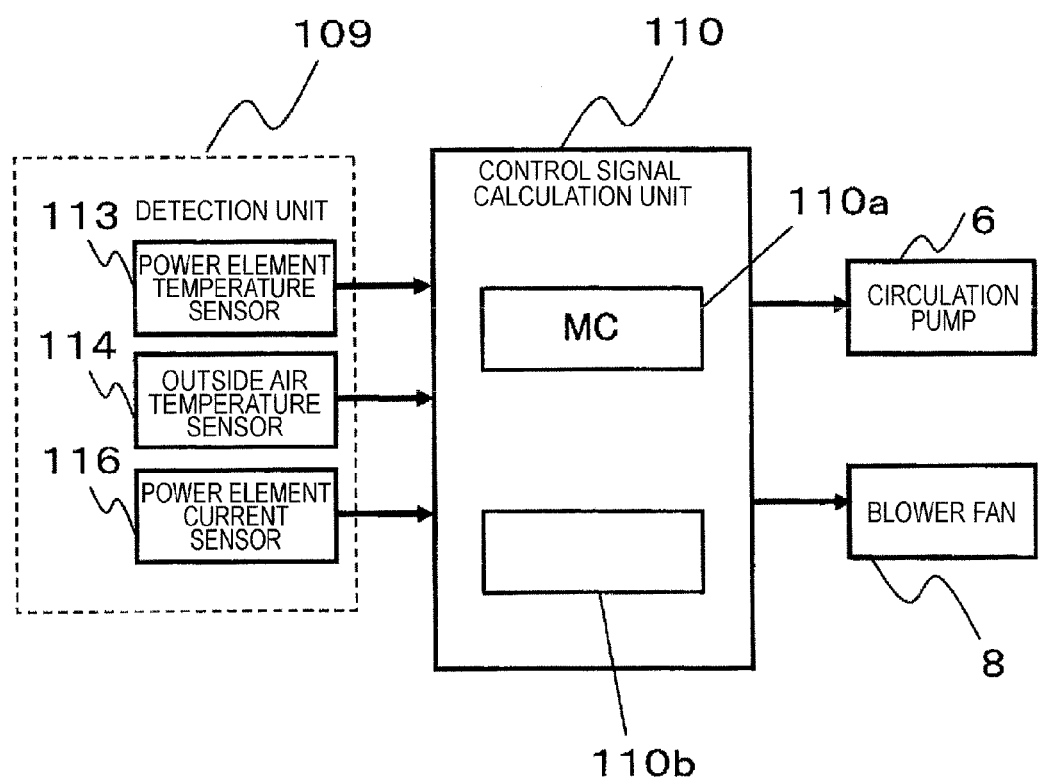
FIG. 8 is a diagram illustrating the schematic configuration of a cooling control system 13 according to a third embodiment.

A third embodiment of the present invention will now be described with reference to FIGS. 8 and 9. FIG. 8 is a diagram illustrating the schematic configuration of a cooling control system 13 according to the third embodiment, where a power element current sensor 116 for detecting the current flowing through a power element 3 is provided in place of the motor torque sensor 111 and the motor speed sensor 112 that are illustrated in FIG. 6. In the following, there will be described mainly a difference from what has been described while assigning the identical reference numeral to a component similar to that illustrated in FIG. 6.

Figure 9:
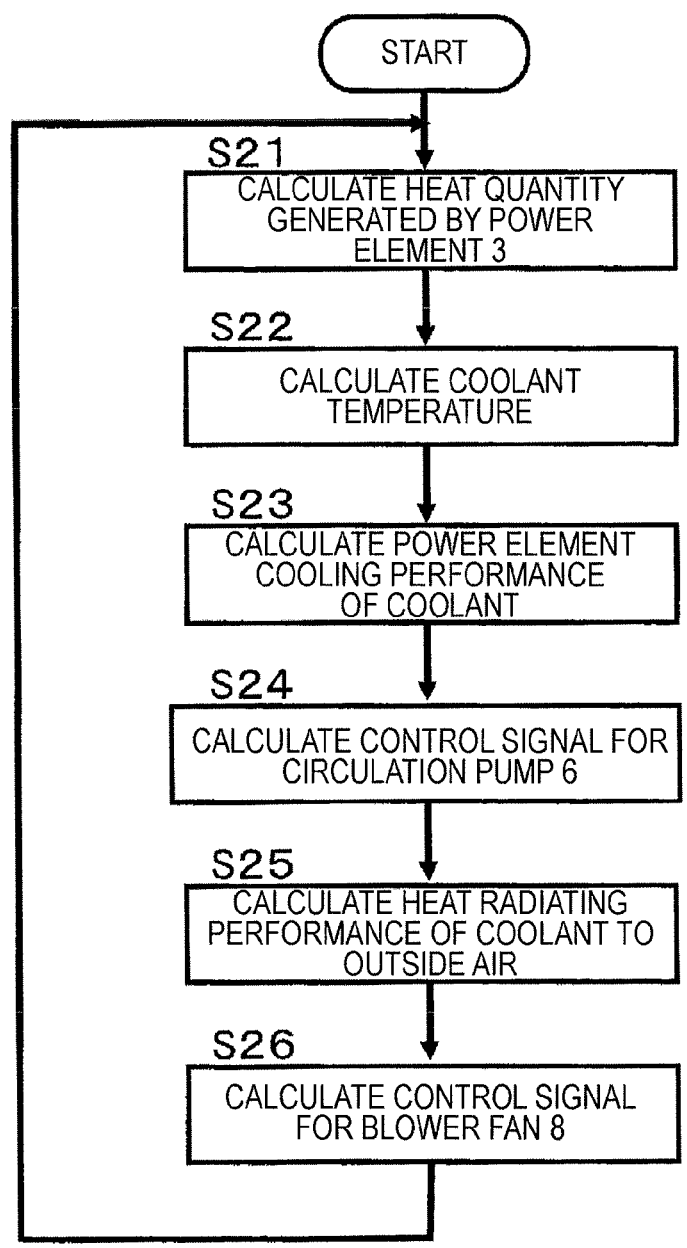
FIG. 9 is a flowchart illustrating the process of controlling a circulation pump 6 and a blower fan 8 according to the third embodiment.

FIG. 9 is a flowchart illustrating the process of controlling a circulation pump 6 and a blower fan 8 by a control signal calculation unit 110. As described above, the power element 3 outputs roughly fixed amount of current to a motor 2 in accordance with the required torque and speed of the motor 2. The heat quantity generated by the power element 3 also depends on the current value of the motor 2. Therefore, heat quantity Q generated by the power element 3 can be calculated from a current value I flowing through the power element 3.

Accordingly, in step S21, the heat quantity Q generated by the power element 3 is calculated from the current value I detected by the power element current sensor 116. The correlation involving the current value I flowing through the power element 3 and the heat quantity generated by the power element 3 is stored as a numerical map in a memory 110*b* included in the control signal calculation unit 110. In step S21, the heat quantity Q generated by the power element 3 is obtained by searching the numerical map.

In step S22, the temperature of a coolant is calculated, that is, temperature Ta of a coolant is calculated on the basis of the heat quantity Q generated by the power element 3 calculated in step S21 and temperature Tw of the power element 3 detected by a power element temperature sensor 113, in the similar manner to the case performed in step S02 of FIG. 7. The coolant temperature is calculated by the aforementioned formula (3), for example.

In step S23, a microcomputer calculates power element cooling performance α of the coolant by using the aforementioned formula (1) on the basis of the heat quantity Q generated by the power element 3 calculated in step S21, the coolant temperature Ta calculated in step S22, and the temperature Tw detected by the power element temperature sensor 113.

In step S24, the microcomputer calculates a control signal for the circulation pump 6 on the basis of the power element cooling performance α of the coolant calculated in step S23 and thereafter controls the circulation pump 6 by the control signal. The control processing performed in step S24 is similar to that performed in step S14 of FIG. 3, whereby the series of processes illustrated in FIG. 4 will be performed in step S24 as well.

In step S25, the microcomputer calculates heat radiating performance to outside air β of the coolant in a heat exchanger 5 by using the aforementioned formula (2) on the basis of the power element cooling performance α calculated in step S23, the coolant temperature Ta calculated in step S22, and temperature Tw detected by an outside air temperature sensor 114.

In step S26, the microcomputer controls the drive of the blower fan 8 on the basis of the heat radiating performance to outside air β of the coolant calculated in step S25, the coolant temperature Ta calculated in step S22, and the temperature Tg detected by the outside air temperature sensor 114. The control processing performed in step S26 is similar to that performed in step S16 of FIG. 3, whereby the series of processes illustrated in FIG. 5 will be performed in step S26 as well.

The process proceeds back to step S21 after completing the process in step S26 of FIG. 9. The series of processes from step S21 to step S26 will be performed repeatedly until an ignition key switch of a vehicle will have been turned off.

Fourth Embodiment

Figure 10:
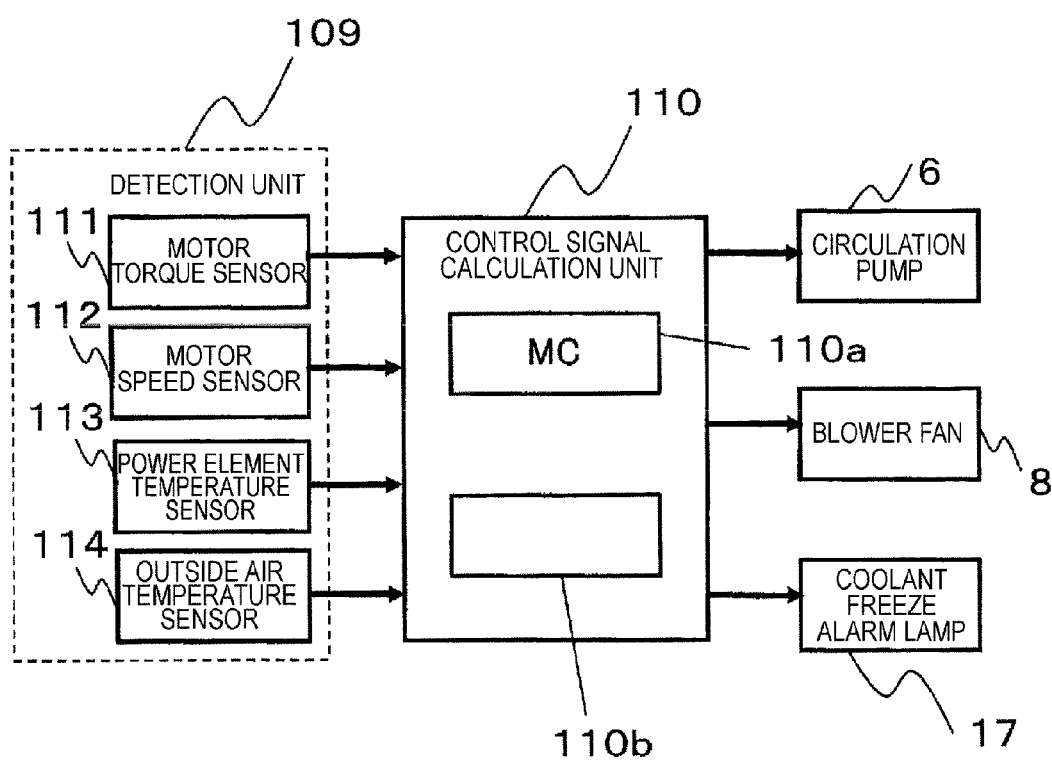
FIG. 10 is a diagram illustrating the schematic configuration of a cooling control system 13 according to a fourth embodiment.

A fourth embodiment of the present invention will now be described with reference to FIGS. 10 and 11. FIG. 10 is a diagram illustrating the schematic configuration of a control system according to the fourth embodiment, the diagram being different from the control system illustrated in FIG. 6 in that a coolant freeze alarm lamp 117 is provided in FIG. 10. Mainly described in the following is a difference from what has been described, while a component similar to that illustrated in FIG. 6 will be assigned a reference numeral identical to that in FIG. 6.

Figure 11:
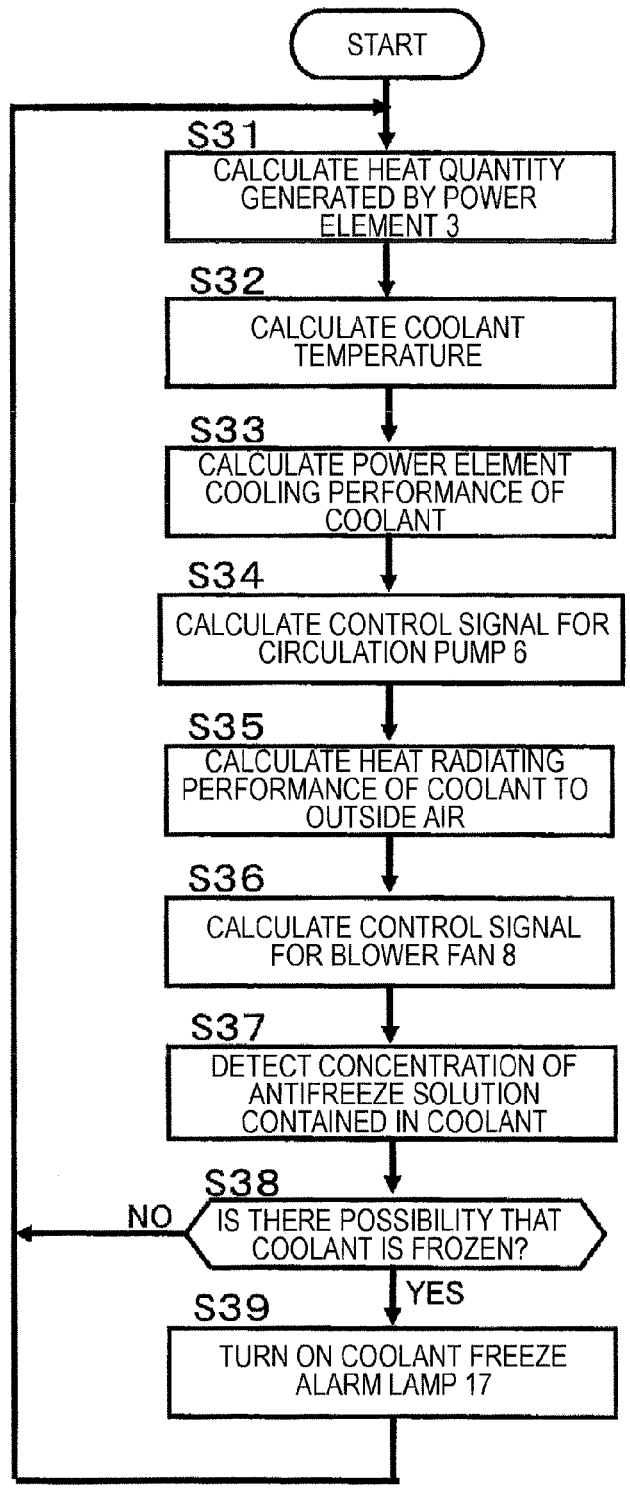
FIG. 11 is a flowchart illustrating the process of controlling a circulation pump 6 and a blower fan 8 according to the fourth embodiment.

FIG. 11 is a flowchart illustrating the process of controlling a circulation pump 6 and a blower fan 8 by a control signal calculation unit 110. The description of the process performed from step S31 to step S36 will be omitted as it is similar to that performed from step S01 to step 06 in FIG. 7.

In step S37, a microcomputer calculates concentration of antifreeze solution m contained in a coolant at temperature Ta on the basis of power element cooling performance α of the coolant calculated in step S33 and a control signal for the circulation pump 6 calculated in step S34. As described above, when the concentration of the antifreeze solution m contained in the coolant is increased, the viscosity of the coolant would increase, thereby causing the power element cooling performance α to be lowered. Moreover, the power element cooling performance α would be improved when the flow rate n of the coolant circulated by the circulation pump 6 is increased.

In step S37, the concentration of the antifreeze solution m is calculated by using the map illustrated in FIGS. 12 and 13. The map where Ta=Ta0 as illustrated in FIG. 13 is used when the coolant temperature is Ta0, in which case a coordinate point (n, α) will be determined upon specifying the flow rate n based on the control signal for the circulation pump 6 and the power element cooling performance α. The concentration of the antifreeze solution m corresponding to a curve L passing through the coordinate point (n, α) will be the concentration of the antifreeze solution m being sought. The concentration m1 would be obtained as the concentration of the antifreeze solution when the flow rate is n1 and the power element cooling performance is αth, for example.

In step S38, the microcomputer determines the possibility of the coolant being frozen by comparing the concentration of the antifreeze solution calculated in step S37 with the outside air temperature Tg detected by the outside air temperature sensor 114. The coolant has a freezing point that varies with the concentration of the antifreeze solution m, the freezing point being higher when the concentration of the antifreeze solution m is decreased, thereby causing the coolant more likely to freeze. The relationship between the concentration of the antifreeze solution m contained in the coolant and the freezing point is stored as a map in a memory 110*b*. In step S38, the microcomputer compares the freezing point for the concentration of the antifreeze solution m calculated in step S37 with the temperature Tg detected by the outside air temperature sensor 14 and determines, when the temperature difference between the freezing point and the outside air temperature Tg is less than or equal to a set value, that there is a possibility that the coolant would be frozen.

When it is determined in step S38 that the coolant would possibly be frozen, the process proceeds to step S39 where the coolant freeze alarm lamp 17 is turned on and thereafter proceeds back to step S31. When it is determined in step S38 that there is no possibility that the coolant would be frozen, the process proceeds back to step S31 by skipping step S39.

Note that in the aforementioned step S38, the temperature detected by the outside air temperature sensor 114 is used as the outside air temperature Tg. However, the determination process in step S38 may also be performed by using a predicted outside air temperature which is obtained by utilizing travel plan information provided by an on-vehicle navigation system and predicting a future outside air temperature from vehicle destination information illustrated in the travel plan information, for example. By adopting such configuration, the microcomputer can issue a warning of the coolant being frozen before the environment around the vehicle is cooled down to the freezing point of the coolant or less.

While the warning is issued by turning on the coolant freeze alarm lamp 117 in step S39, the following process may also be added or provided in place of the process in step S39. That is, a cooling circuit 4 may be provided with a discharge port from which the coolant is discharged outside the cooling circuit 4 and an electromagnetic valve which opens/closes the discharge port so that, when it is determined in step S38 that the coolant would possibly be frozen, the control signal calculation unit 110 can prevent the coolant from being frozen in the cooling circuit 4 by sending the control signal to open the electromagnetic valve of the discharge port and discharge the coolant. The cooling circuit 4 would not therefore be disrupted. In this case, the coolant can be discharged efficiently by providing the discharge port below the cooling circuit 4.

(1) The cooling system of the power converter for the on-vehicle rotary electric machine in the aforementioned embodiments includes: the cooling circuit 4 which has the circulation pump 6 circulating the coolant containing the antifreeze solution and cools down, by means of the coolant, the power element 3 mounted in the power converter for the on-vehicle rotary electric machine; the control signal calculation unit 110 as heat quantity calculation means which calculates the heat quantity Q generated by the power element 3; the power element temperature sensor 113 as first temperature acquisition means which acquires the temperature of the power element 3; the coolant temperature sensor 115 as second temperature acquisition means which acquires the temperature of the coolant; the control signal calculation unit 110 as heat transfer rate calculation means which calculates, on the basis of the heat quantity Q, the temperature of the power element, and the coolant temperature, the heat transfer rate (power element cooling performance $\alpha$) that is the amount of heat transferred from the power element 3 to the coolant via the heat radiating plate 7 per unit temperature difference; and the control signal calculation unit 110 as pump control means which decreases the amount of the coolant discharged by the circulation pump 6 when the calculated heat transfer rate ($\alpha$) is greater than a predetermined heat transfer rate reference ($\alpha$th).

The heat transfer rate (power element cooling performance $\alpha$) reflecting the condition of the coolant (the concentration of the antifreeze solution m, the flow rate n, and the coolant temperature Ta) can thus be obtained by calculating the heat transfer rate (power element cooling performance $\alpha$) on the basis of the heat quantity Q generated by the power element 3, the temperature of the power element 3, and the coolant temperature. Then, by comparing the heat transfer rate (power element cooling performance $\alpha$) with the reference value $\alpha$th, it can be determined whether there is a margin in the current power element cooling performance. When there is a margin in the power element cooling performance (the heat transfer rate is greater than the predetermined heat transfer rate reference), the energy consumed by the cooling system can be reduced by lowering the driving power of the circulation pump 6 without hindering the cooling of the power element 3.

(2) Note that the coolant temperature may also be calculated by the control signal calculation unit 110 as the second temperature acquisition means on the basis of the calculated heat quantity Q generated by the power element and the temperature of the power element detected and acquired by the power element temperature sensor 113 as the first temperature acquisition means. The temperature sensor for detecting the coolant temperature can be omitted with such configuration, thereby allowing the cost of the cooling system to be reduced.

(3) Moreover, the circulation pump 6 can be properly controlled even when the coolant temperature Ta is changed by setting the heat transfer rate reference ($\alpha$th) by the control signal calculation unit 110 as reference setting means in accordance with a level of the temperature of the power element acquired by the power element temperature sensor 113 as the first temperature acquisition means.

(4) Furthermore, the discharge amount of the coolant by the circulation pump 6 is increased when the calculated heat transfer rate (power element cooling performance $\alpha$) is less than the predetermined heat transfer rate reference ($\alpha$th) so that the flow rate of the coolant would be increased, thereby causing the power element cooling performance of the coolant as well as the reliability of the power element 3 to be improved.

(5) The cooling system may also be adapted to include: the heat exchanger 5 which is provided in the cooling circuit 4 to exchange heat between the outside air and the coolant; a blower (the blower fan 8) which blows the outside air to the heat exchanger 5; the outside air temperature sensor 114 as third temperature acquisition means which acquires the outside air temperature; the control signal calculation unit 110 as heat exchange rate calculation means which calculates the heat exchange rate between the outside air and the coolant on the basis of the heat transfer rate (power element cooling performance $\alpha$), the coolant temperature Ta, and the outside air temperature Tg; and the control signal calculation unit 110 as air blow control means which decreases the air flow supplied from the blower when the calculated heat exchange rate is greater than the predetermined heat exchange rate reference ($\beta$th). The energy consumed by the cooling system can thus be reduced by decreasing the air flow supplied from the blower when the heat exchange rate is greater than the predetermined heat exchange rate reference ($\beta$th) and there is a margin in terms of the amount of heat radiated by the heat exchanger 5.

(6) Moreover, the sensor for detecting the outside air temperature can be omitted by using the temperature acquired by the first temperature acquisition means (power element temperature sensor 113) or the second temperature acquisition means (coolant temperature sensor 115) at the time the cooling system is started as the outside air temperature, thereby allowing the cost of the cooling system to be reduced.

(7) Note that the heat quantity Q may be calculated on the basis of torque and speed information of the rotary electric machine (motor 2) or the current value flowing through the power element 3.

(8) Furthermore, an alarm device (antifreeze solution freeze alarm lamp 117) which issues an alarm to warn about the freezing of the coolant on the basis of the concentration of the antifreeze solution contained in the coolant is provided, the concentration of the antifreeze solution being calculated on the basis of the coolant temperature, the calculated heat transfer rate (power element cooling performance α), and the control signal output from the control signal calculation unit 110 as the pump control means. As a result, one can be informed of the freezing of the antifreeze solution in advance so that he/she can properly cope with the freezing of the antifreeze solution.

Each of the aforementioned embodiments may be used alone or in combination because the effects of each embodiment can be obtained by itself or multiplied. Moreover, the present invention is not to be limited to the aforementioned embodiments as long as the features of the present invention are preserved.

The disclosure of the following priority application is herein incorporated by reference:

Japanese Patent Application No. 2011-008009 (filed Jan. 18, 2011)

The invention claimed is:

1. A cooling system of a power converter for an on-vehicle rotary electric machine comprising:
   a cooling circuit which has a circulation pump to circulate a coolant containing antifreeze solution and cools down, by using the coolant, a power element mounted in a power converter for an on-vehicle rotary electric machine;
   a heat quantity calculation unit which calculates heat quantity generated by the power element;
   a first temperature acquisition unit which acquires temperature of the power element;
   a second temperature acquisition unit which acquires temperature of the coolant;
   a heat transfer rate calculation unit which calculates, on the basis of the heat quantity, the temperature of the power element, and the temperature of the coolant, a heat transfer rate that is an amount of heat transferred from the power element to the coolant per unit temperature difference; and
   a pump control unit which decreases an amount of the coolant discharged by the circulation pump when the heat transfer rate calculated is greater than a predetermined heat transfer rate reference, wherein
   the heat quantity calculation unit calculates the heat quantity on the basis of torque information and speed information of a rotary electric machine.

2. The cooling system of a power converter for an on-vehicle rotary electric machine according to claim 1, wherein the second temperature acquisition unit calculates the temperature of the coolant on the basis of the heat quantity generated by the power element that is calculated by the heat quantity calculation unit and the temperature of the power element that is acquired by the first temperature acquisition unit.

3. The cooling system of a power converter for an on-vehicle rotary electric machine according to claim 2, comprising:
   a reference setting unit which sets the heat transfer rate reference in accordance with a level of the temperature of the power element acquired by the first temperature acquisition unit.

4. The cooling system of a power converter for an on-vehicle rotary electric machine according to claim 2, wherein
   the pump control unit increases an amount of the coolant discharged by the circulation pump when the heat transfer rate calculated is less than the predetermined heat transfer rate reference.

5. The cooling system of a power converter for an on-vehicle rotary electric machine according to claim 2, comprising:
   a heat exchanger which is provided in the cooling circuit to exchange heat between outside air and the coolant;
   a blower which blows outside air to the heat exchanger;
   a third temperature acquisition unit which acquires outside air temperature;
   a heat exchange rate calculation unit which calculates a heat exchange rate between the outside air and the coolant on the basis of the heat transfer rate, the temperature of the coolant, and the outside air temperature; and
   a blow control unit which decreases an air flow supplied from the blower when the heat exchange rate calculated is greater than a predetermined heat exchange rate reference.

6. The cooling system of a power converter for an on-vehicle rotary electric machine according to claim 1, comprising:
   a heat exchanger which is provided in the cooling circuit to exchange heat between outside air and the coolant;
   a blower which blows outside air to the heat exchanger;
   a third temperature acquisition unit which acquires outside air temperature;
   a heat exchange rate calculation unit which calculates a heat exchange rate between the outside air and the coolant on the basis of the heat transfer rate, the temperature of the coolant, and the outside air temperature; and
   a blow control unit which decreases an air flow supplied from the blower when the heat exchange rate calculated is greater than a predetermined heat exchange rate reference.

7. The cooling system of a power converter for an on-vehicle rotary electric machine according to claim 6, wherein
   the third temperature acquisition unit uses temperature acquired by the first temperature acquisition unit or the second temperature acquisition unit at the time the cooling system is started as the outside air temperature.

8. The cooling system of a power converter for an on-vehicle rotary electric machine according to claim 1, comprising:
   a concentration calculation unit which calculates concentration of antifreeze solution contained in the coolant on the basis of the temperature of the coolant acquired by the second temperature acquisition unit, the heat transfer rate calculated by the heat transfer rate calculation unit, and a control signal output from the pump control unit; and an alarm device which issues an alarm to warn about freezing of the coolant on the basis of the concentration of the antifreeze solution calculated by the concentration calculation unit.

9. A cooling system of a power converter for an on-vehicle rotary electric machine comprising:
a cooling circuit which has a circulation pump to circulate a coolant containing antifreeze solution and cools down, by using the coolant, a power element mounted in a power converter for an on-vehicle rotary electric machine;
a heat quantity calculation unit which calculates heat quantity generated by the power element;
a first temperature acquisition unit which acquires temperature of the power element;
a second temperature acquisition unit which acquires temperature of the coolant;
a heat transfer rate calculation unit which calculates, on the basis of the heat quantity, the temperature of the power element, and the temperature of the coolant, a heat transfer rate that is an amount of heat transferred from the power element to the coolant per unit temperature difference;
a pump control unit which decreases an amount of the coolant discharged by the circulation pump when the heat transfer rate calculated is greater than a predetermined heat transfer rate reference; and
a reference setting unit which sets the heat transfer rate reference in accordance with a level of the temperature of the power element acquired by the first temperature acquisition unit, wherein
the second temperature acquisition unit sets the temperature of the coolant equal to the temperature of the power element acquired by the first temperature acquisition unit when the power element does not produce heat and when a predetermined time period has passed during which the power element has produced no heat, and
the second temperature acquisition unit calculates the temperature of the coolant on the basis of the heat quantity generated by the power element that is calculated by the heat quantity calculation unit and the temperature of the power element that is acquired by the first temperature acquisition unit.

10. The cooling system of a power converter for an on-vehicle rotary electric machine according to claim 9, wherein
the pump control unit increases an amount of the coolant discharged by the circulation pump when the heat transfer rate calculated is less than the predetermined heat transfer rate reference.

11. The cooling system of a power converter for an on-vehicle rotary electric machine according to claim 9, wherein
the heat quantity calculation unit calculates the heat quantity on the basis of torque information and speed information of a rotary electric machine.

12. The cooling system of a power converter for an on-vehicle rotary electric machine according to claim 9, wherein
the heat quantity calculation unit calculates the heat quantity on the basis of a current value flowing through the power element.

13. The cooling system of a power converter for an on-vehicle rotary electric machine according to claim 9, comprising:
a concentration calculation unit which calculates concentration of antifreeze solution contained in the coolant on the basis of the temperature of the coolant acquired by the second temperature acquisition unit, the heat transfer rate calculated by the heat transfer rate calculation unit, and a control signal output from the pump control unit; and
an alarm device which issues an alarm to warn about freezing of the coolant on the basis of the concentration of the antifreeze solution calculated by the concentration calculation unit.

14. A cooling system of a power converter for an on-vehicle rotary electric machine comprising:
a cooling circuit which has a circulation pump to circulate a coolant containing antifreeze solution and cools down, by using the coolant, a power element mounted in a power converter for an on-vehicle rotary electric machine;
a heat quantity calculation unit which calculates heat quantity generated by the power element;
a first temperature acquisition unit which acquires temperature of the power element;
a second temperature acquisition unit which acquires temperature of the coolant;
a heat transfer rate calculation unit which calculates, on the basis of the heat quantity, the temperature of the power element, and the temperature of the coolant, a heat transfer rate that is an amount of heat transferred from the power element to the coolant per unit temperature difference; and
a pump control unit which decreases an amount of the coolant discharged by the circulation pump when the heat transfer rate calculated is greater than a predetermined heat transfer rate reference, wherein
the second temperature acquisition unit sets the temperature of the coolant equal to the temperature of the power element acquired by the first temperature acquisition unit when the power element does not produce heat and when a predetermined time period has passed during which the power element has produced no heat,
the second temperature acquisition unit calculates the temperature of the coolant on the basis of the heat quantity generated by the power element that is calculated by the heat quantity calculation unit and the temperature of the power element that is acquired by the first temperature acquisition unit, and
the pump control unit increases an amount of the coolant discharged by the circulation pump when the heat transfer rate calculated is less than the predetermined heat transfer rate reference.

15. The cooling system of a power converter for an on-vehicle rotary electric machine according to claim 14, wherein
the heat quantity calculation unit calculates the heat quantity on the basis of torque information and speed information of a rotary electric machine.

16. The cooling system of a power converter for an on-vehicle rotary electric machine according to claim 14, wherein
the heat quantity calculation unit calculates the heat quantity on the basis of a current value flowing through the power element.

17. The cooling system of a power converter for an on-vehicle rotary electric machine according to claim 14, comprising:
a concentration calculation unit which calculates concentration of antifreeze solution contained in the coolant on the basis of the temperature of the coolant acquired by the second temperature acquisition unit, the heat transfer rate calculated by the heat transfer rate calculation unit, and a control signal output from the pump control unit; and
an alarm device which issues an alarm to warn about freezing of the coolant on the basis of the concentration of the antifreeze solution calculated by the concentration calculation unit.

* * * * *